US006078861A

United States Patent [19]

Zimmerman et al.

[11] Patent Number: 6,078,861

[45] Date of Patent: Jun. 20, 2000

[54] ONBOARD DIAGNOSTIC MONITORING FOR FLEXIBLE FUEL VEHICLES

[75] Inventors: Bret Alan Zimmerman, Harper Woods; Ace Koua Kue, Farmington Hills, both of Mich.

[73] Assignee: Ford Global Technologies, Inc., Dearborn, Mich.

[21] Appl. No.: 09/172,424

[22] Filed: Oct. 14, 1998

[51] Int. Cl.[7] ........................... F02D 41/22; G01M 15/00

[52] U.S. Cl. ......................... 701/114; 123/479; 73/117.3; 73/118.1

[58] Field of Search ..................................... 701/107, 109, 701/114; 123/690, 479, 494, 575, 1 A, 406.3, 403.31; 73/116, 117.3, 118.1

[56] References Cited

U.S. PATENT DOCUMENTS

| | | |
|---|---|---|
| 4,945,881 | 8/1990 | Gonze et al. . |
| 5,003,956 | 4/1991 | Iwamoto et al. . |
| 5,230,322 | 7/1993 | Curran et al. . |
| 5,467,755 | 11/1995 | Konrad et al. . |
| 5,671,141 | 9/1997 | Smith et al. . |
| 5,679,890 | 10/1997 | Shinohara et al. . |

*Primary Examiner*—Andrew M. Dolinar
*Attorney, Agent, or Firm*—Allan J. Lippa; Roger L. May

[57] ABSTRACT

Onboard diagnostic monitors that are affected by a changing A/F activity resulting from fuel type mixture are disabled during such activity to avoid false malfunction diagnosis. A changing A/F is detected from the difference between a fast and a slow filtered value of an input signal from a fuel type sensor. If the difference value exceed a predetermined threshold, the monitors that are affected are disabled. After the A/F has stabilized, the filtered values converge and the monitoring is resumed.

12 Claims, 2 Drawing Sheets tl = FAST FILTERED SENSOR OUTPUT
t2 = SLOW FILTERED SENSOR OUTPUT
α = DIFFERENCE BETWEEN
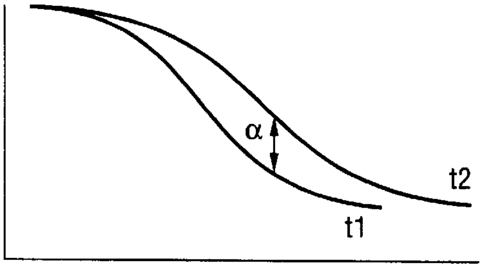
*Fig. 2*
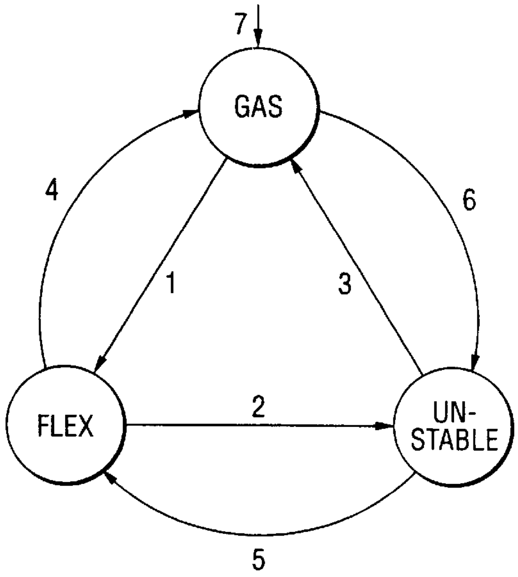
*Fig. 3*
*Fig. 4*
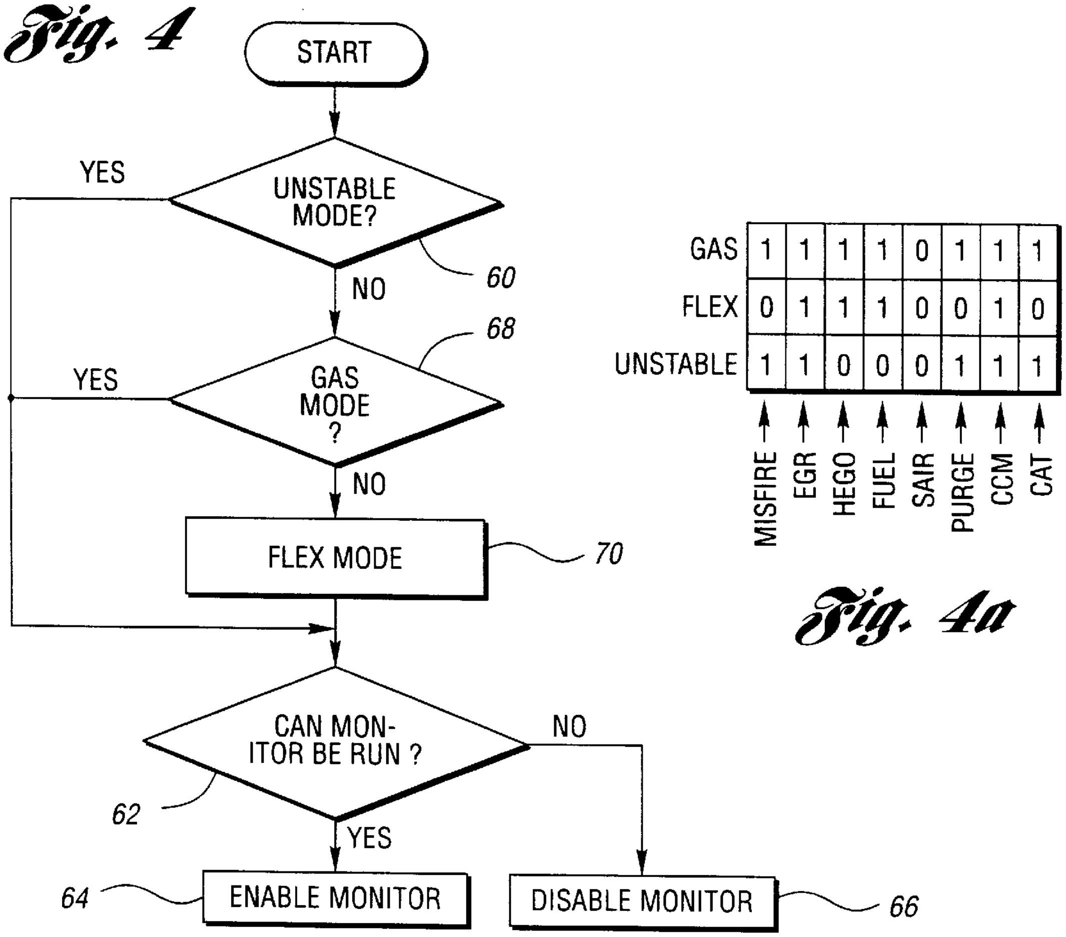
| | | | | | | | | |
|---|---|---|---|---|---|---|---|---|
| GAS | 1 | 1 | 1 | 1 | 0 | 1 | 1 | 1 |
| FLEX | 0 | 1 | 1 | 1 | 0 | 0 | 1 | 0 |
| UNSTABLE | 1 | 1 | 0 | 0 | 0 | 1 | 1 | 1 |
| | MISFIRE | EGR | HEGO | FUEL | SAIR | PURGE | CCM | CAT |
*Fig. 4a*

ONBOARD DIAGNOSTIC MONITORING FOR FLEXIBLE FUEL VEHICLES

TECHNICAL FIELD

This invention relates to control and diagnostic systems for flexible fuel vehicles and, more particularly, to control of onboard diagnostic monitoring during transitions in fuel composition for such vehicles.

BACKGROUND OF THE INVENTION

Modern automotive engines contain electronic engine control systems which vary operating parameters of the engine, such as air/fuel ratios and ignition timing, to achieve optimum performance. Such control systems are capable of changing engine operating parameters in response to a variety of external conditions.

A primary function of electronic engine control systems is to maintain the ratio of air and fuel at or near stoichiometry. Electronic engine control systems operate in a variety of modes depending on engine conditions, such as starting, rapid acceleration, sudden deceleration, and idle. One mode of operation is known as closed-loop control. Under closed-loop control, the amount of fuel delivered is determined primarily by the concentration of oxygen in the exhaust gas. The concentration of oxygen in the exhaust gas being indicative of the ratio of air and fuel that has been ignited.

The oxygen in the exhaust gas is sensed by a Heated Exhaust Gas Oxygen (HEGO) sensor. The electronic fuel control system adjusts the amount of fuel being delivered in response to the output of the HEGO sensor. A sensor output indicating a rich air/fuel mixture (an air/fuel mixture above stoichiometry) will result in a decrease in the amount of fuel being delivered. A sensor output indicating a lean air/fuel mixture (an air/fuel mixture below stoichiometry) will result in an increase in the amount of fuel being delivered.

Electronic engine control systems operate in a variety of modes depending on engine conditions, such as starting, rapid acceleration, sudden deceleration, and idle. Under closed-loop control, the amount of fuel delivered is determined primarily by the concentration of oxygen in the exhaust gas. The concentration of oxygen in the exhaust gas being indicative of the ratio of air and fuel that has been ignited. A flexible fuel vehicle is capable of operating on different fuels, such as gasoline, methanol, or a mixture of the two, utilize electronic engine control systems to change the engine operating parameters in response to the type of fuel being delivered to the engine. The engines of these vehicles can be run on any combination of gasoline and up to 85% alcohol. Such systems utilize a Flexible Fuel Sensor (FFS) to detect the type of fuel being delivered to the engine and a computer or controller to calculate the percent of alcohol in the fuel and vary the engine operating parameters accordingly. The computer is programmed to control such emission sensitive factors as spark timing, fuel, exhaust gas recirculation, secondary air injection, idle speed, and canister purge. An example of such a system is disclosed in Curran et al. in U.S. Pat. No. 5,230,322.

The combustion of air/fuel mixtures in internal combustion engines, such as those found in automobiles, produces an exhaust gas stream comprised of various gaseous components. Some of these components, such as hydrocarbons (HC), carbon monoxide (CO), and oxides of nitrogen ($NO_x$), may be termed noxious components. Those skilled in the art will appreciate that oxides of nitrogen refers to both NO and $NO_2$. Environmental concerns have led to ever stricter regulations concerning the maximum allowed emissions of these particular components. Accordingly, the computer may also be programmed to perform diagnostic routines to verify proper actuator and sensor operation, and perform system checks, and to control a malfunction indicator light (MIL) to inform the driver of any problem and store fault codes for later use by service personnel. There are a number of advantages to be realized where a highly reliable diagnostic system is provided. Not only do lower emissions result from maintaining the systems in proper working order, but greater customer satisfaction arises from being accurately informed as early as possible of a malfunction. The California Air Resources Board (CARB) has adopted regulations for onboard diagnostic systems which require a self-monitoring emission and powertrain control system. When a system or component is found to exceed established emission thresholds or a component is operating outside its manufacturer specified tolerances, a fault code must be stored and a malfunction indicator light on the vehicle instrument cluster must be illuminated. Such an onboard diagnostic system (OBD) is disclosed in U.S. Pat. No. 5,671,141, assigned to the assignee of the present invention.

When a vehicle, with gasoline in the fuel tank, has a fuel containing 85% alcohol added, a blend of less than 85% alcohol will be formed, depending on the amount added and the amount of gasoline in the tank prior to fueling. As the vehicle is driven, the fuel supplied to the engine will transition from the "old" fuel to the "new" blend of fuel. Certain OBD monitors, such as the HEGO and FUEL monitors, are affected by instability in fuel makeup. Therefore, it is inadvisable to perform such monitoring during conditions of changing A/F such as occur during the transition described above.

SUMMARY OF THE INVENTION

In accordance with the present invention, certain onboard diagnostic activity is disabled during conditions of changing A/F to avoid false malfunction diagnosis associated with these changes. More specifically, a changing A/F is detected by comparing two filtered values of the input signal from the FFS. The first value results from a fast filtering of the input, while the second value results from a very slow filtering of the input. During changes, the output of the fast filter changes quickly relative to the output of the slow filter and a delta or difference value results from the comparison. If the delta value exceed a predetermined threshold, a disable monitor flag is set effectively disabling the OBD monitors that are affected by the changing A/F. After the A/F has stabilized, the filtered values converge and the flag is reset, permitting OBD monitoring to resume.

BRIEF DESCRIPTION OF THE DRAWINGS

A more complete understanding of the present invention may be had from the following detailed description which should be read in conjunction with the drawings in which:

FIG. 2 is a graph comparing two filtered values of a fuel sensor resulting from changes in A/F.

FIG. 3 a transition state diagram between various fuel use modes;

FIG. 4 is a flowchart depicting the method of the present invention;

FIG. 4*a* is a truth table identifying the OBD sensors that are enabled in the various fuel use modes.

DETAILED DESCRIPTION OF THE PREFERRED EMBODIMENT

Figure 1:
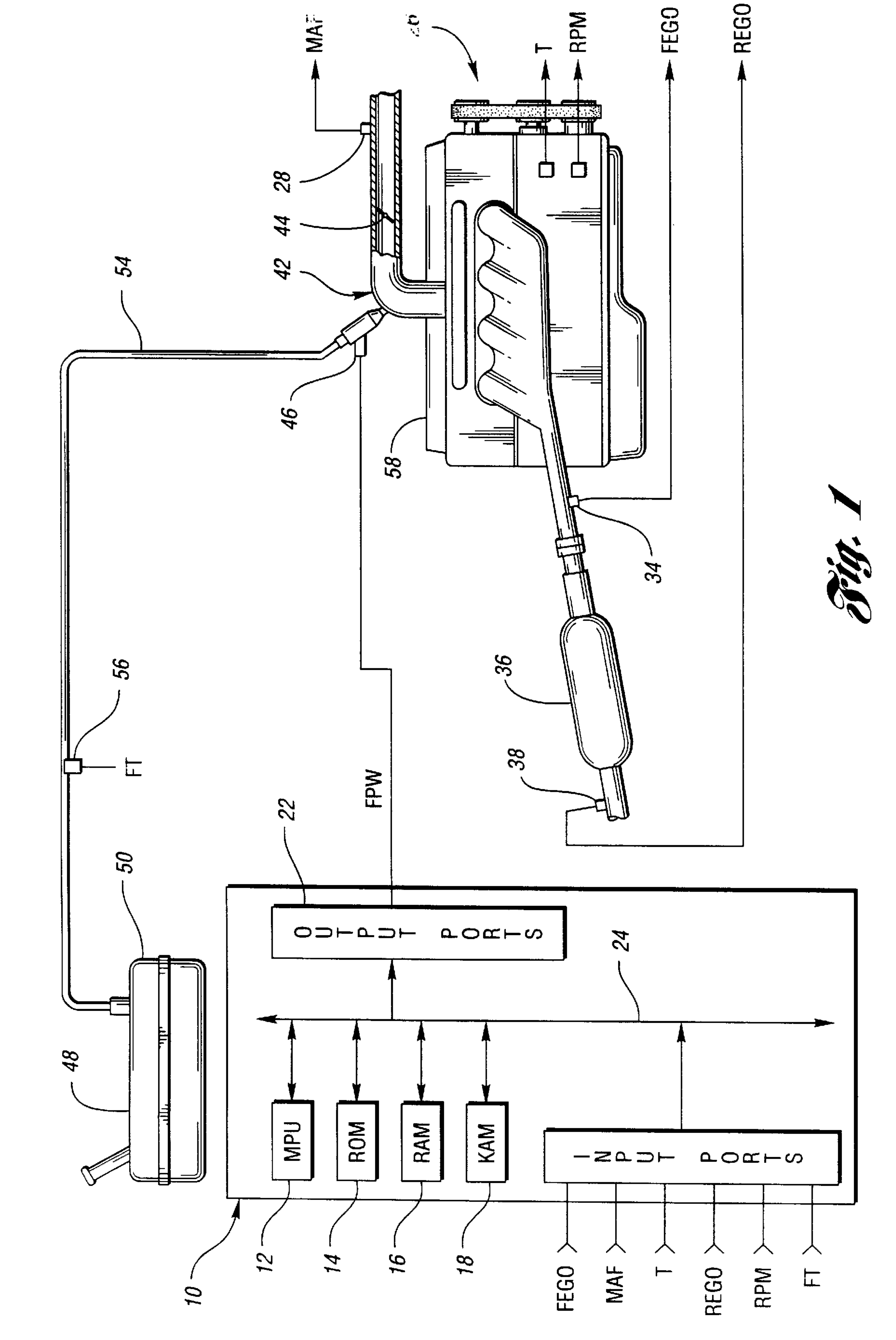
FIG. 1 is a schematic block diagram of an engine control system programmed to carry out the method of the present invention.

Referring now to the drawings and initially to FIG. 1, a conventional microcomputer based controller 10 includes: a microprocessor unit(MPU) 12; read-only memory(ROM) 14; random access memory(RAM) 16; keep-alive memory (KAM) 18; input ports 20; output ports 22; and a conventional data bus 24. Controller 10 is shown receiving various signals from sensors coupled to engine 26 including: measurement of inducted mass airflow(MAF) from mass airflow sensor 28; engine coolant temperature(T) from temperature sensor 30; an indication of engine speed (rpm) from tachometer 32; a front exhaust gas oxygen sensor output signal FEGO from an EGO sensor 34 positioned upstream of a catalytic converter 36, and a rear exhaust gas oxygen sensor output signal REGO from an EGO sensor 38 positioned downstream of the catalytic converter 36. Intake manifold 40 of engine 26 is shown coupled to throttle body 42 having a primary throttle plate 44 positioned therein. Throttle body 42 is also shown having fuel injector 46 coupled thereto for delivering liquid fuel in proportion to a pulse width of signal fpw from controller 10. Fuel is delivered to fuel injector 46 by a conventional fuel system including fuel tank 48, fuel pump 50, and fuel rail 54. A fuel-type sensor 56, positioned along the fuel rail 54, detects the type of fuel being pumped to the fuel injectors 46 by measuring the capacitance of the fuel and transmits the resulting fuel-type signal FT to the controller 10. The sensor 56 may be of a type that produces a square wave output of, for example, a frequency of 50 Hz for gas, 115 Hz for E85, 135 Hz for M85, and a frequency that is directly proportional to the alcohol content for intermediate mixtures of gasoline and alcohol. E85 is a fuel that contains 85% ethanol and M85 is a fuel that contains 85% methanol.

Other engine components and systems such as an ignition system are not shown because they are well known to those skilled in the art. Although a central fuel injection system is shown, the invention claimed herein may be used to advantage with other types of systems such as sequential fuel injection or carbureted systems. Those skilled in the art will also recognize that the invention claimed herein is applicable to other engine control configurations such as "stereo" control systems wherein the fuel injectors for each bank are controlled by a separate exhaust gas oxygen sensor positioned in each of the exhaust manifolds in engines having a "V" configuration. Also, while the preferred embodiment of the invention uses the output of the sensor 56 to determined fuel composition, it should be understood that fuel composition determination may be obtained by other methods such as processing the output of the sensor 34.

Referring now to FIG. 2, a graphical representation of the two filtered outputs t1 and t2 of the FFS signal FT is shown, depicting the alcohol content stability of the fuel at the sensor 56. The processing of the signal to produce the filtered outputs t1 and t2 is performed by software routines programmed in ROM. Alternatively, dedicated hardware filters could be used. T1 represents a fast filtering of FT on the order of, for example, 5 seconds. T2 represents a very slow filtering of FT on the order of, for example, 60–75 seconds. The invention is not dependent on the details of the filtering characteristics which can be set to any desirable value during calibration. The values plotted represent variation in A/F with time, where the A/F is directly proportional to the fuel composition at the sensor 56. FIG. 2 depicts a situation where a flexible fuel vehicle initially running gasoline has fuel added that is composed of 85% alcohol and 15% gasoline. As the fuel mixture reaches the sensor 56, the output of the fast filter tends to follow the actual fuel composition whereas the output of the slower filter diverges over time and at some later point, when the composition stabilizes, reaches the same value as the output of the fast filter. The difference in filtered output value is identified as $\alpha$.

Referring now to the state diagram depicted in FIG. 3, there are three states or modes of engine operation identified as GAS, FLEX, and UNSTABLE. The FLEX mode requires a stable fuel content at the sensor 56 of any combination of gasoline and up to 85% alcohol. The GAS mode requires a stable fuel content at the sensor 56 of any combination of gasoline and less than 12% alcohol. The UNSTABLE mode is entered based on the rate of change of the fuel content. Assuming the engine is in the GAS mode of operation, that mode will continue as long as the fuel content is stable i.e. the difference $\alpha$ is below a predetermined value, for example 0.1 A/F per second. If the fuel content is stable and above 12% alcohol, a transition from GAS to FLEX mode is dictated as indicated at 1. The engine operation will return to the GAS mode if a stabilized fuel content of less that 12% alcohol is detected, as indicated at 4. While the engine is in either the GAS or FLEX modes of operation, a transition to the UNSTABLE mode is dictated if the fuel content becomes unstable, i.e., the difference $\alpha$ is greater than the aforementioned predetermined value, as indicated at 6 and 2, respectively. When the fuel contents stabilizes, i.e., the difference $\alpha$ is less than the aforementioned predetermined value, a transition from the UNSTABLE mode to the GAS mode is dictated, as indicated at 3, if the alcohol content is below 12% alcohol. Similarly, after the fuel content stabilizes, a transition to the FLEX mode from the UNSTABLE mode is dictated, as indicated at 5, if the alcohol content is above 12% alcohol. The engine is reset to the GAS mode as indicated at 7.

Various onboard diagnostic routines are carried out by the controller 10. These routines are referred to as "monitors" in the flowchart of FIG. 4. A separate monitor module is provided for each of a plurality of powertrain systems or components in order to test for a malfunction and to report the malfunction. Each monitor module includes the software and hardware needed to decide if a system or component has degraded to a point where established emission thresholds are exceeded or a component exceeds manufacturer specified tolerances. Of the system monitor modules, three perform intrusive tests and five perform tests that are nonintrusive. The intrusive tests are so designated because they take control of the engine for a short period of time. The intrusive tests include those run by an exhaust gas oxygen (HEGO) monitor module, a secondary air system (SAIR) monitor module, an evaporative system (PURGE) monitor module. The nonintrusive tests include those run by a fuel control system (FUEL) monitor module, an engine misfire (MISFIRE) monitor module, an exhaust gas recirculation (EGR) system monitor module, a comprehensive components (CCM) monitor module and a catalytic converter efficiency (CAT) monitor module. Further detail may be found in the aforementioned U.S. Pat. No. 5,671,141.

Referring now to FIG. 4, a flowchart of the computer program implementing the method of the present invention as shown. At decision block 60, a determination is made whether an unstable condition in a transition between GAS and FLEX fuels is occurring. Block 60 determines whether the difference between the slow and fast time filtered outputs of the sensor 56 is greater than a predetermined calibration value. If so, a check at decision block 62 is made to determined whether certain of the OBD monitors should be disabled. The truth table in FIG. 4*a* shows the logic implemented by block 62. The monitor is enabled at block 64 if a logic "1" appear in the UNSTABLE row of the table. If a logic "0" appears the monitor is disabled at block 66. If the NO path is taken out of block 60, a check is made at decision block 68 as to whether the fuel is gasoline, i.e., engine is operating in the GAS mode, and if so then a determination is made at block 62 whether the various monitors in the truth table should be enabled or disabled based on the row titled GAS. Similarly, if the engine is operating in the FLEX mode, i.e., not in either the GAS or UNSTABLE modes, as indicated in block 70, the appropriate monitors are enabled or disabled as indicate in the row titled FLEX in the truth table of FIG. 4*a*.

While the best mode for carrying out the present invention has been described in detail, those familiar with the art to which this invention relates will recognize various alternative designs and embodiments for practicing the invention as defined by the following claims.

What is claimed is:

1. A method of controlling an onboard diagnostic monitor of a flexible fuel vehicle having an internal combustion engine comprising a sequence of the following steps:

providing a fuel content value indicative of the relative amounts of gasoline and an alternative fuel in a line that is supplying a fuel mixture to said engine;

determining whether the fuel mixture supplied, is in an unstable condition during transition between a gasoline mixture containing less than a predetermined amount of alternative fuel and an alternative fuel mixture containing less than a predetermined amount of gasoline fuel; and disabling said onboard diagnostic monitor upon detection of said unstable condition.

2. The method of claim 1 wherein said unstable condition is a function of the rate of change of said fuel content value.

3. The method of claim 2 wherein said unstable condition exist when the difference between relatively fast and slow filtered values of said fuel content value, exceeds a predetermined value.

4. The method of claim 3 wherein said engine is operable in GAS, FLEX, and UNSTABLE modes, and transitions to said UNSTABLE mode from said GAS or FLEX modes is dependent on whether or not said unstable condition exist.

5. An onboard diagnostic system for a flexible fuel vehicle having an internal combustion engine comprising:

means providing a fuel content value indicative of the relative amounts of gasoline and an alternative fuel in a line supplying fuel to said engine;

computer means responsive to said fuel content value for determining whether the fuel supplied is at an unstable condition in transition between a gasoline mixture containing less than a predetermined amount of alternative fuel and an alternative fuel mixture containing less than a predetermined amount of gasoline fuel; and said computer means including at least one diagnostic routine that is disabled upon detection of said unstable condition.

6. The system of claim 5 wherein said unstable condition is a function of the rate of change of said fuel content value.

7. The system of claim 6 wherein said unstable condition exist when the difference between relatively fast and slow filtered values of said fuel content value, exceeds a predetermined value.

8. The system of claim 7 wherein said engine is operable in GAS, FLEX, and UNSTABLE modes, and transitions to said UNSTABLE mode from said GAS or FLEX modes is dependent on whether or not said unstable condition exist.

9. A method of vehicle onboard diagnostics comprising a sequence of the steps of:

sensing the content of the fuel being supplied to the engine of said vehicle and providing a signal indicative of said content;

obtaining a difference value between a relatively fast filtered value of said signal and a relatively slow filtered value of said signal; and disabling an onboard diagnostic monitor if said difference value exceeds a predetermined value.

10. The method of claim 9 wherein the monitor disabled is an exhaust gas oxygen sensor monitor.

11. The method of claim 9 wherein the monitor disabled is a fuel control system monitor.

12. The method of claim 9 wherein the monitor disabled is a secondary air system monitor.

* * * * *